(12) United States Patent
Taima

(10) Patent No.: US 8,947,685 B2
(45) Date of Patent: Feb. 3, 2015

(54) METHOD FOR SELECTING INTERPRETERS FOR PDF DIRECT PRINTING

(75) Inventor: Katsuyuki Taima, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 653 days.

(21) Appl. No.: 13/169,302

(22) Filed: Jun. 27, 2011

(65) Prior Publication Data

US 2012/0327439 A1 Dec. 27, 2012

(51) Int. Cl.
*G06F 3/12* (2006.01)
*G06K 15/02* (2006.01)

(52) U.S. Cl.
CPC ........ *G06F 15/1823* (2013.01); *G06K 15/1856* (2013.01); *G06F 3/1248* (2013.01)
USPC .............................. 358/1.13; 358/1.9; 358/2.1

(58) Field of Classification Search
CPC ..................................................... G06F 3/1248
USPC ................................................. 358/1.1–3.29
See application file for complete search history.

(56) References Cited

U.S. PATENT DOCUMENTS

2002/0140958 A1* 10/2002 Lester .......................... 358/1.13
2007/0024885 A1   2/2007 Kim
2009/0086238 A1*  4/2009 Dozier ......................... 358/1.13
2011/0194142 A1*  8/2011 Wakana ....................... 358/1.15
2011/0261392 A1* 10/2011 Mail ............................ 358/1.15

OTHER PUBLICATIONS

Info Trends, Inc., "The Working and Benefits of a Next Generation PDF Print Workflow", Strategic Assessment, May 18, 2010.

* cited by examiner

*Primary Examiner* — Benny Q Tieu
*Assistant Examiner* — Marcellus Augustin
(74) *Attorney, Agent, or Firm* — Chen Yoshimura LLP

(57) ABSTRACT

A method implemented in a printer for PDF direct printing. The printer includes a PDF interpreter such as APPE (Adobe PDF Print Engine), and at least one other interpreter also capable of interpreting PDF data, such as a PostScript interpreter. The printer automatically selects either APPE or the PS interpreter or both to interpret a PDF document. If the PDF document is PDF/VT, PDF/X-4 or later, then APPE is selected. If the PDF document is not one of these versions but contains transparency data, APPE is selected to interpret the pages containing transparency data, and the other pages may be interpreted using the PS interpreter. If the PDF document is not one of the above versions and contains no transparency data, the PS interpreter is selected. Other factors such as the busy status of the interpreters may be considered in making the selection.

21 Claims, 3 Drawing Sheets

METHOD FOR SELECTING INTERPRETERS FOR PDF DIRECT PRINTING

BACKGROUND OF THE INVENTION

1. Field of the Invention

This invention relates to PDF direct printing by a printer, and in particular, it relates to a method for automatically selecting one or more interpreters among multiple interpreters for processing the PDF document.

2. Description of Related Art

PDF (Portable Document Format) is a very popular format used in a wide array of applications, including the Print On Demand market. PDF direct printing is a process by which a PDF file is sent directly to a compatible printer device without first using an application or print driver to pre-process the PDF data into a traditional print language such as PDL (Page Description Language). The PDF data is processed by the printer itself and printed. PDF direct printing may be initiated, for example, from a computer connected to the printer, by dragging a PDF file icon to a printer utility icon on the Microsoft® Windows desktop, or by right-clicking the file and choosing the "print" command. It may also be initiated, on a printer that has slots to receive flash or other memory devices, from the printer itself. Some software for managing large printers used in professional print shops also has the ability to initiate PDF direct printing.

A PDF direct printing-enabled printer is typically equipped with multiple interpreters, also referred to as raster image processors (RIPs). An interpreter generates bitmap images from input data such as PDL, PostScript®, PDF, etc. Examples of interpreters include PCL (Printer Command Language) interpreter, Adobe®'s Configurable Postscript Interpreter (CPSI), Adobe PDF Print Engine (APPE), etc. Some interpreters are capable of processing different types of input document. For example, CPSI can process PDF documents in addition to PS data. Some conventional PDF direct printing-enabled printers are equipped with two or more interpreters that can process PDF data, such as APPE or CPSI, and allow the user to select one of the multiple interpreters to process a given PDF document by using a user interface (e.g. an operation panel on the printer, a web browser-based screen on a client computer connected to the printer, etc.). The selected interpreter is used to process the entire PDF document. For example, if APPE is selected, it is used for processing the entire PDF document, and the CPSI interpreter is not used.

SUMMARY

The present invention is directed to a method and related apparatus in a PDF direct printing-enable printer for automatically selecting one or more interpreters to be used to process a PDF document during PDF direct printing.

An object of the present invention is to improve the performance of PDF direct printing by a printer.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a printer for processing a PDF document for PDF direct printing, the printer including a first interpreter and a second interpreter, the method including: (a) analyzing characteristics of the PDF document; (b) based on the analysis of step (a), automatically selecting the first interpreter or the second interpreter or both interpreters concurrently to be used to interpret the PDF document; and (c) based on the selection of step (b), interpreting the PDF document using the selected interpreter or interpreters. The selection in step (b) may further be based on a busy or error status of the first and second interpreters.

In one example, the first interpreter is Adobe PDF Print Engine (APPE) and the second interpreter is a Postscript interpreter, wherein step (b) includes: if the version of the PDF document is one of a pre-defined plurality of PDF versions (PDF/VT, PDF/X-4 or later), or the PDF document contains transparency data, selecting only the APPE interpreter to be used to interpret the PDF document.

In another example, the first interpreter is Adobe PDF Print Engine (APPE) and the second interpreter is a Postscript interpreter, wherein step (b) includes: (b1) if the version of the PDF document is one of a pre-defined plurality of PDF versions, selecting only the APPE interpreter to be used to interpret the PDF document; and (b2) if the version of the PDF document is not one of the pre-defined plurality of PDF versions, performing steps (b3) to (b5) for each page of the PDF document: (b3) determining whether the page contains transparency data; (b4) if the page contains transparency data, selecting the APPE interpreter to be used to interpret the page; and (b5) if the page contains no transparency data, selecting either the APPE interpreter or the second interpreter to be used to interpret the page.

In another aspect, the present invention provides a printer comprising a print engine, one or more processors, and a memory having programs stored therein for controlling the one or more processors, the program being configured to cause the one or more processors to execute a process for processing a PDF document for PDF direct printing, the process including the method steps described above.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 3:
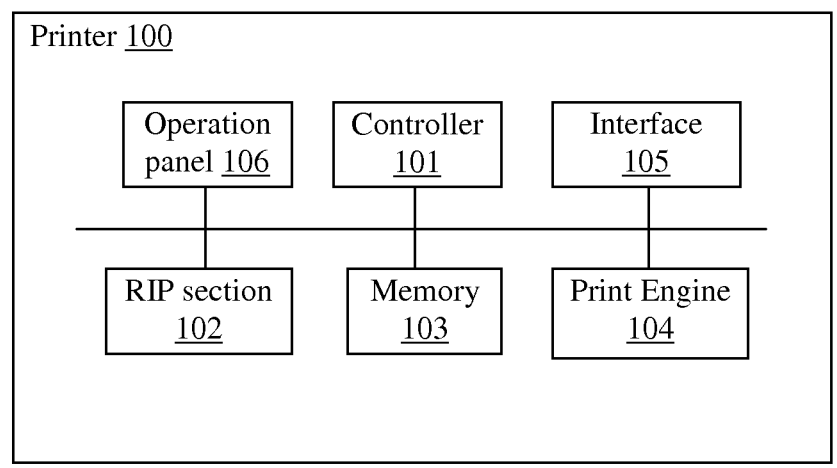
FIG. 3 schematically illustrates a printer in which embodiments of the present invention may be implemented.

FIG. 3 illustrates a printer 100 in which methods according to embodiments of the present invention may be implemented. The printer 100 includes a printer controller 101, an RIP section 102, one or more memories 103 for storing programs and data, a print engine 104, a communication interface 105 for communicating with external devices, and an operation panel 106 for interacting with a user. Some of these components may be optional. The communication interface 105 may include a network interface device for communicating over a network, and/or an USB interface for receiving a USB device such as a memory device, and/or a card reader for receiving memory cards, etc. The methods described below are implemented in the printer controller 101 and the RIP section 102 by executing programs stored in the memory 103 as software or firmware. The RIP section 103 includes multiple interpreters, including, for example, a PDF interpreter such as APPE, a PostScript interpreter such as CPSI, and other interpreters such as a PCL interpreter, etc. The printer controller 101 and the RIP section 102 may be implemented on one processor or separate processors (CPUs). The multiple interpreters may be implemented by separate processors, or by one processor capable of multithreaded execution.

In addition, embodiments of the present invention may also be implemented on a print server (not shown) which has a printer controller but does not have a print engine. The print server has memory for storing relevant programs and processors for executing the programs.

Embodiments of the present invention provide a method implemented in a PDF direct printing-enabled printer 100 for automatically selecting one or more interpreters to process the PDF document during PDF direct printing. In one embodiment, each PDF document is processed by one interpreter, and the interpreter is automatically selected by the printer controller based on the nature of the PDF document, such as the PDF version or PDF format used by the document, and (optionally) other factors such as the status of the multiple interpreters. In another embodiment, different pages of a PDF document may be processed by different interpreters, and two or more interpreters may concurrently process the same PDF document.

The descriptions below use APPE and CPSI as examples of two interpreters that are both capable of processing PDF data, but the invention is not limited to this specific example.

Different interpreters have different capabilities and advantages or disadvantages. For example, APPE currently can process only PDF data, while CPSI can process both PS data and PDF data. However, CPSI cannot correctly handle transparency data in PDF data, but APPE can. Further, APPE supports PDF/VT (a PDF format useful for variable data printing (VDP)), PDF/X-4 and later, while CPSI does not. These factors are used to determine which interpreter(s) will be used to process a given PDF document.

Figure 1:
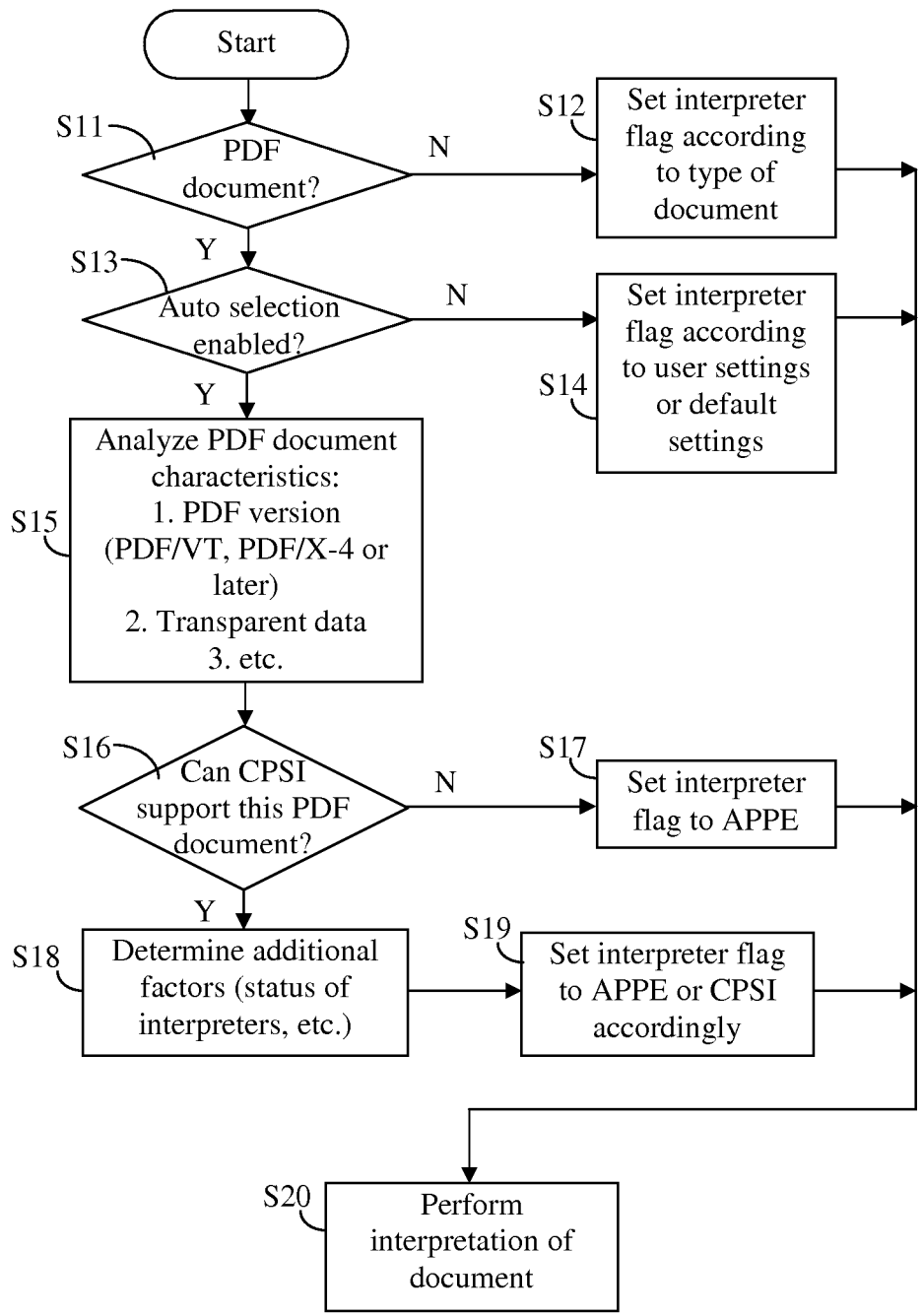
FIG. 1 schematically illustrates a PDF direct printing method according a first embodiment of the present invention.

FIG. 1 illustrates a method for automatically selecting interpreters according to a first embodiment of the present invention. After PDF direct printing is initiated, the printer determines whether the document to be printed is a PDF document or another type of document (step S11). This may be done by examining the header of the documents. If it is not a PDF document ("N" in step S11), an appropriate flag is set to indicate which interpreter is to be used to perform interpretation for the document, based on the type of the document (step S12). For example, if the document is in PostScript format, a flag for PS interpreter is set.

If the document is a PDF document ("Y" in step S11), the printer determines whether the automatic interpreter selection function is enabled (step S13). If it is not enabled ("N" in step S13), the printer controller set an appropriate flag to indicate which interpreter is to be used to perform interpretation for the document, based on settings set by the user or default settings (step S14). It should be noted that prior to initiating PDF direct printing for a document, the settings will have already been set so that the automatic interpreter selection function is either enabled or disabled, and if it is disabled, then either APPE or CPSI is selected to be used as the interpreter for PDF. The settings may be set by a user using the operation panel of the printer or a user interface display on a client computer connected to the printer; default settings may be stored in the printer controller in case the user does not set the settings.

If the automatic interpreter selection function is enabled ("Y" in step S13), the printer analyzes characteristics of the PDF document (step S15) to determine whether the PDF document can be properly supported by CPSI (step S16). The analysis step S15 includes determining the PDF version or format of the document, which may be done by examining the header of the document, as well as determining whether the content of the PDF document contains certain specific types of data such as transparency data. In the illustrated embodiment, the printer determines whether the PDF version/format is PDF/VT, or PDF/X-4, or later. These versions are not supported by CPSI. (Note here that different varieties of PDFs may be referred to as different formats and/or different versions; in the present disclosure, the term "PDF version" is used to generally refer to different varieties of PDFs.) The printer also determines whether the PDF document contains transparency data, as transparency processing is also not properly supported by CPSI. Transparency data may be indicated in a PDF document by, for example, <xapTPg:HasvisibleTransparency>, or
</xapTPg:HasvisibleTransparency>.

If the PDF document is one of the above-listed versions, or if the PDF document contains the specific types of data ("N" in step S16), the printer sets a flag to indicate that APPE is to be used to perform interpretation for the document (step S17).

If the PDF document can be properly supported by CPSI ("Y" in step S16), then either CPSI or APPE may be used to interpret the PDF document. The printer further determines additional factors that may influence the decision of which interpreter to use (step S18). These factors may include the processing speed of each interpreter. Further, if the different interpreters are implemented by different processors, then the busy status of the processors (e.g., number of queued jobs for the processor) may be taken into consideration. For example, if one interpreter is currently busy processing a previous document, then it may be preferable to send the current document to the other interpreter. In addition, if one interpreter is currently encountering an error condition, then the document may be sent to the other interpreter. Based on the consideration of these additional factors, the printer sets a flag to indicate whether APPE or CPSI is to be used to perform interpretation for the document (step S19). Step S18 is optional; if it is omitted, then in step S19 the flag will be set to CPSI.

Then, the PDF document is interpreted using an interpreter according to the flags set in steps S12, S14, S17 and S19 (step S20).

Figure 2:
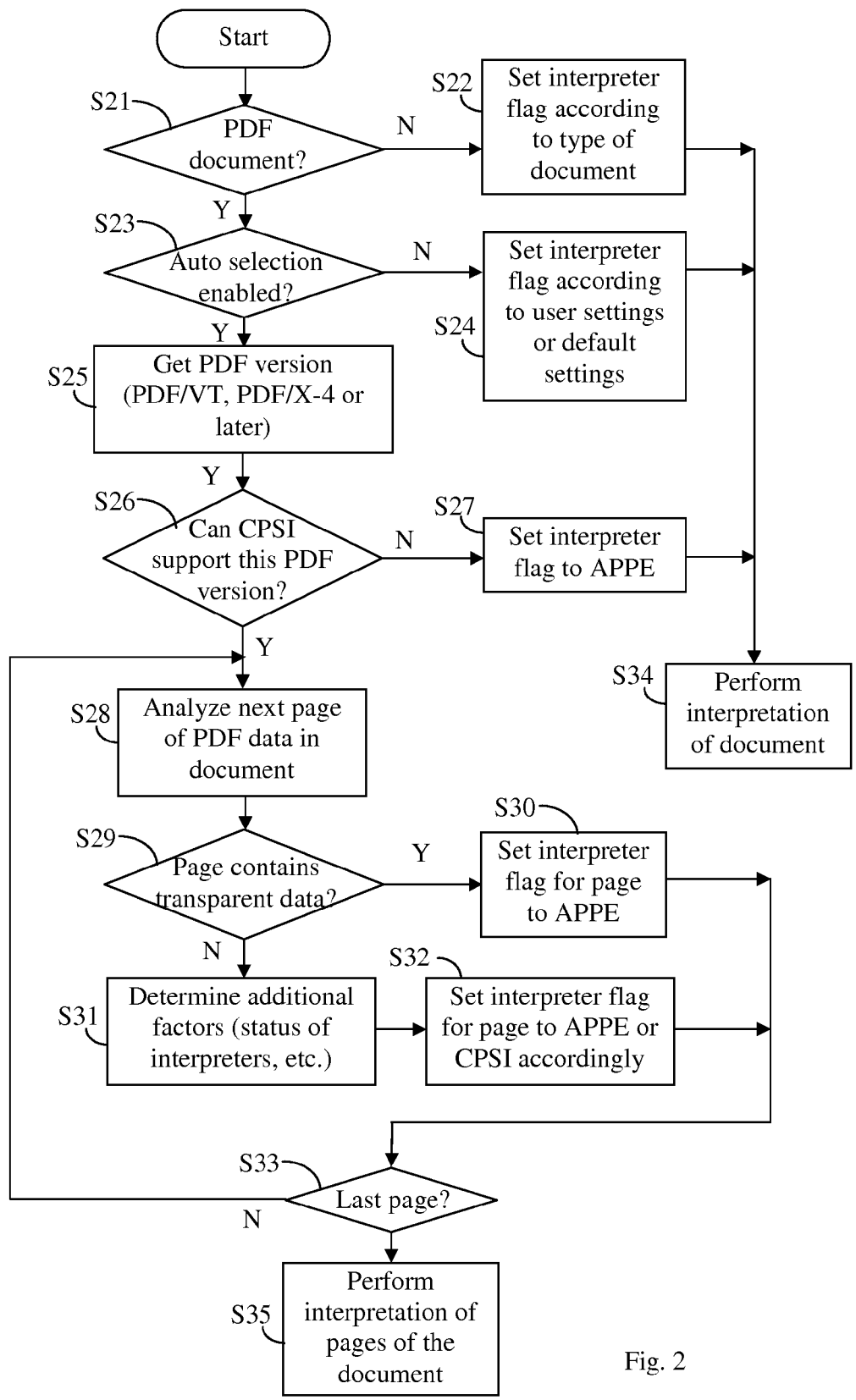
FIG. 2 schematically illustrates a PDF direct printing method according a second embodiment of the present invention.

FIG. 2 illustrates a method for automatically selecting interpreters according to a second embodiment of the present invention. In this embodiment, the PDF document to be printed is analyzed at the document level as well as the page level to determine which interpreter is to be used to interpret the document or the pages of the document. In FIG. 2, steps S21 to S24 and S34 are identical to steps S11 to S14 and S20, respectively, of the method shown in FIG. 1.

In step S23, if the automatic interpreter selection function is enabled ("Y" in step S23), the printer obtains the PDF version of the document (step S25), such as by examining the header of the document, to determine whether the PDF version is supported by CPSI (step S26). In the illustrated embodiment, if the printer determines that the PDF version is one of PDF/VT, PDF/X-4 or a later version, which are not supported by CPSI ("N" in step S26), the printer sets a flag to indicate that APPE is to be used to perform interpretation for the document (step S27), and the PDF document is interpreted using the APPE interpreter (step S34).

If the PDF version is not one of the above-listed versions ("Y" in step S26), the printer further analyzes the content (PDF data) of each page of the document (step S28) to determine whether the page contains certain specific types of data, such as transparency data, that cannot be properly supported by CPSI (step S29). If the page contains such types of data ("Y" in step S29), the printer sets a flag to indicate that APPE is to be used to perform interpretation for this page (step S30).

If the page does not contain such types of data ("N" in step S29), then either CPSI or APPE may be used to interpret the page. The printer further determines additional factors that may influence the decision of which interpreter to use (step S31), such as the speed or busy or error status of the interpreters. Based on the consideration of these additional factors, the printer sets a flag to indicate whether APPE or CPSI is to be used to perform interpretation for the page (step S32). Step S31 is optional; if it is omitted, then in step S32 the flag will be set to CPSI.

Steps S28 to S32 are repeated for subsequent pages of the PDF document ("N" in step S33). After all pages are analyzed ("Y" in step S33), the pages of the PDF document are interpreted using the appropriate interpreters according to the flags set in steps S30 and S32 (step S35). Alternatively, interpretation of a page can start as soon as the interpreter flag is set for the page, because the interpreters are typically running on processors (RIPs) that are separate from the processor (typically the printer controller) that executes the automatic interpreter selection process (i.e. steps S21 to S33). The interpreters will process the pages of PDF data stored in the memory of the printer based on the flags set for each page. It is noted that the nature of PDF documents is such that each page can be readily processed separately from other pages. As pages of the PDF document are interpreted, the bitmap images for the pages are stored in the memory. The print engine obtains the bitmaps from the memory for printing, regardless of which interpreter generated the bitmaps.

It can be seen that when the two or more interpreters are implemented by two or more separate processors, the first and second embodiments of the present invention can achieve parallel processing of PDF documents by the two or more processors. In the first embodiment, the current PDF may be processed by one interpreter while a previous PDF document is being processed by another interpreter. In the second embodiment, two interpreters may concurrently process different pages of the document. It is noted that for some printers, in particular large printers commonly used in professional print shops, the speed of the print engine is greater than the speed of the interpreters, so the print engine is capable of printing the bitmaps concurrently generated by the two interpreters.

The automatic interpreter selection method can be used for error handling. For example, if an error occurs when one of the interpreters is processing a document or a page, the control process can automatically cause the document or page to be re-processed by another suitable interpreter.

A messaging or control mechanism may be implemented for various components of the printer to cooperate with each other to accomplish the above described functions. The printer controller typically controls the operation of the other components of the printer. For example, the printer controller can obtain the busy or error status of the RIPs. Such a control mechanism can be readily implemented by those skilled in the relevant art.

In the above descriptions, APPE and CPSI are used as examples of PDF interpreters and PS interpreters, but the invention is not limited to such specific examples. The invention may be used with other PDF interpreters and PS interpreters. Further, the selection may be made among three or more interpreters of the printer. More generally, the automatic interpreter selection method described in the above embodiments can be implemented when the printer has two or more interpreters that can both process a given type of document but with different capabilities and advantages. In the above embodiments, the factors that influence the selection of interpreters include the PDF version and specific types of data in the document such as transparency data, but other factors may be considered.

The automatic interpreter selection method of embodiments of the present invention has many advantages, such as efficient use of interpreter resources, increased printer performance, etc.

It will be apparent to those skilled in the art that various modification and variations can be made in the automatic interpreter selection method and related apparatus of the present invention without departing from the spirit or scope of the invention. Thus, it is intended that the present invention cover modifications and variations that come within the scope of the appended claims and their equivalents.

What is claimed is:

1. A method implemented in a printer for processing a PDF document for PDF direct printing, the printer including a first interpreter and a second interpreter, the method comprising:
   (a) analyzing characteristics of the PDF document;
   (b) based on the analysis of step (a) and a busy or error status of the first and second interpreters, automatically selecting the first interpreter or the second interpreter or both interpreters concurrently to be used to interpret the PDF document; and
   (c) based on the selection of step (b), interpreting the PDF document using the selected interpreter or interpreters.

2. The method of claim 1, wherein the characteristics analyzed in step (a) include a PDF version of the document and presence of specified types of data in the PDF document.

3. The method of claim 2, wherein the first interpreter is Adobe PDF Print Engine (APPE) and the second interpreter is a Postscript interpreter, and wherein step (b) includes: if the version of the PDF document is one of a pre-defined plurality of PDF versions, or the PDF document contains transparency data, selecting only the APPE interpreter to be used to interpret the PDF document.

4. The method of claim 3, wherein the pre-defined plurality of PDF versions include PDF/VT, PDF/X-4 or later.

5. The method of claim 1, wherein the first interpreter is Adobe PDF Print Engine (APPE) and the second interpreter is a Postscript interpreter,
   wherein step (a) includes detecting a version of the PDF by checking the document header without analyzing a content of the document; and
   wherein step (b) includes:
   (b1) if the version of the PDF document determined in step (a) is one of a pre-defined plurality of PDF versions, selecting only the APPE interpreter to be used to interpret the PDF document without analyzing the content of the document; and (b2) if the version of the PDF document determined in step (a) is not one of the pre-defined plurality of PDF versions, performing steps (b3) to (b5) for each page of the PDF document:
- (b3) determining whether the page contains transparency data;
- (b4) if the page contains transparency data, selecting the APPE interpreter to be used to interpret the page; and
- (b5) if the page contains no transparency data, selecting either the APPE interpreter or the second interpreter to be used to interpret the page.

6. The method of claim 5, wherein the pre-defined plurality of PDF versions include PDF/VT, PDF/X-4 or later.

7. The method of claim 5, wherein the selection in step (b5) is based on a busy or error status of the first and second interpreters.

8. A printer comprising a print engine, one or more processors, and a memory having programs stored therein for controlling the one or more processors, the program being configured to cause the one or more processors to execute a process for processing a PDF document for PDF direct printing, the process comprising:
- (a) analyzing characteristics of the PDF document;
- (b) based on the analysis of step (a) and a busy or error status of the first and second interpreters, automatically selecting the first interpreter or the second interpreter or both interpreters concurrently to be used to interpret the PDF document; and
- (c) based on the selection of step (b), interpreting the PDF document using the selected interpreter or interpreters.

9. The printer of claim 8, wherein the characteristics analyzed in step (a) include a PDF version of the document and presence of specified types of data in the PDF document.

10. The printer of claim 9, wherein the first interpreter is Adobe PDF Print Engine (APPE) and the second interpreter is a Postscript interpreter, and wherein step (b) includes: if the version of the PDF document is one of a pre-defined plurality of PDF versions, or the PDF document contains transparency data, selecting only the APPE interpreter to be used to interpret the PDF document.

11. The printer of claim 10, wherein the pre-defined plurality of PDF versions include PDF/VT, PDF/X-4 or later.

12. The printer of claim 8, wherein the first interpreter is Adobe PDF Print Engine (APPE) and the second interpreter is a Postscript interpreter,
wherein step (a) includes detecting a version of the PDF by checking the document header without analyzing a content of the document; and
wherein step (b) includes:
- (b1) if the version of the PDF document determined in step (a) is one of a pre-defined plurality of PDF versions, selecting only the APPE interpreter to be used to interpret the PDF document without analyzing the content of the document; and
- (b2) if the version of the PDF document determined in step (a) is not one of the pre-defined plurality of PDF versions, performing steps (b3) to (b5) for each page of the PDF document:
  - (b3) determining whether the page contains transparency data;
  - (b4) if the page contains transparency data, selecting the APPE interpreter to be used to interpret the page; and
  - (b5) if the page contains no transparency data, selecting either the APPE interpreter or the second interpreter to be used to interpret the page.

13. The printer of claim 12, wherein the pre-defined plurality of PDF versions include PDF/VT, PDF/X-4 or later.

14. The printer of claim 12, wherein the selection in step (b5) is based on a busy or error status of the first and second interpreters.

15. A computer program product comprising a computer usable non-transitory medium having a computer readable program code embedded therein for controlling a computer, the computer readable program code configured to cause the computer to execute a process for processing a PDF document for PDF direct printing, the process comprising:
- (a) analyzing characteristics of the PDF document;
- (b) based on the analysis of step (a) and a busy or error status of the first and second interpreters, automatically selecting the first interpreter or the second interpreter or both interpreters concurrently to be used to interpret the PDF document; and
- (c) based on the selection of step (b), interpreting the PDF document using the selected interpreter or interpreters.

16. The computer program product of claim 15, wherein the characteristics analyzed in step (a) include a PDF version of the document and presence of specified types of data in the PDF document.

17. The computer program product of claim 16, wherein the first interpreter is Adobe PDF Print Engine (APPE) and the second interpreter is a Postscript interpreter, and wherein step (b) includes: if the version of the PDF document is one of a pre-defined plurality of PDF versions, or the PDF document contains transparency data, selecting only the APPE interpreter to be used to interpret the PDF document.

18. The computer program product of claim 17, wherein the pre-defined plurality of PDF versions include PDF/VT, PDF/X-4 or later.

19. The computer program product of claim 16, wherein the first interpreter is Adobe PDF Print Engine (APPE) and the second interpreter is a Postscript interpreter,
wherein step (a) includes detecting a version of the PDF by checking the document header without analyzing a content of the document; and
wherein step (b) includes:
- (b1) if the version of the PDF document determined in step (a) is one of a pre-defined plurality of PDF versions, selecting only the APPE interpreter to be used to interpret the PDF document without analyzing the content of the document; and
- (b2) if the version of the PDF document determined in step (a) is not one of the pre-defined plurality of PDF versions, performing steps (b3) to (b5) for each page of the PDF document:
  - (b3) determining whether the page contains transparency data;
  - (b4) if the page contains transparency data, selecting the APPE interpreter to be used to interpret the page; and
  - (b5) if the page contains no transparency data, selecting either the APPE interpreter or the second interpreter to be used to interpret the page.

20. The computer program product of claim 19, wherein the pre-defined plurality of PDF versions include PDF/VT, PDF/X-4 or later.

21. The computer program product of claim 19, wherein the selection in step (b5) is based on a busy or error status of the first and second interpreters.

* * * * *